US012801963B2

(12) United States Patent
Feldman et al.

(10) Patent No.: US 12,801,963 B2
(45) Date of Patent: Nov. 17, 2026

(54) QUANTUM COMPUTING FOR GENERATING ALL DIAGNOSES OF A DIGITAL CIRCUIT

(71) Applicant: Xerox Corporation, Norwalk, CT (US)

(72) Inventors: Aleksandar B. Feldman, Oakland, CA (US); Johan de Kleer, Los Altos, CA (US); Ion Matei, Mountain View, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 634 days.

(21) Appl. No.: 18/361,605

(22) Filed: Jul. 28, 2023

(65) Prior Publication Data

US 2024/0078459 A1 Mar. 7, 2024

Related U.S. Application Data

(60) Provisional application No. 63/402,353, filed on Aug. 30, 2022.

(51) Int. Cl.
*G06N 10/20* (2022.01)
*G06N 10/70* (2022.01)

(52) U.S. Cl.
CPC ............. *G06N 10/20* (2022.01); *G06N 10/70* (2022.01)

(58) Field of Classification Search
None
See application file for complete search history.

(56) References Cited

U.S. PATENT DOCUMENTS

| | | | | |
|---|---|---|---|---|
| 2007/0273401 A1* | 11/2007 | Kiryu | ............. | G01R 31/318536 326/16 |
| 2010/0229061 A1* | 9/2010 | Hapke | ............ | G01R 31/318342 714/740 |
| 2019/0244128 A1* | 8/2019 | Choi | ...................... | G06N 10/20 |
| 2020/0242208 A1* | 7/2020 | Daraeizadeh | ....... | G06F 11/1048 |
| 2022/0197764 A1* | 6/2022 | Jun | ..................... | G06F 11/2236 |

OTHER PUBLICATIONS

Wong (Springer), H. Y. Wong, "Quantum Oracles and Construction of Quantum Gate Matrices," Ch. 22, in Introduction to Quantum Computing, Springer (2022) (Year: 2022).*

* cited by examiner

*Primary Examiner* — Eleni A Shiferaw
(74) *Attorney, Agent, or Firm* — Yao Legal Services, Inc.; Shun Yao

(57) ABSTRACT

One embodiment provides a method and a system for diagnosing a digital circuit. During operation, the system can obtain a design of the digital circuit, generate a design of a diagnostic circuit by augmenting the design of the digital circuit based on a number of fault-emulating subcircuits, and convert the design of the diagnostic circuit to a design of a quantum oracle circuit. The system can further construct a quantum diagnostic circuit based on the design of the quantum oracle circuit and observe states of the quantum diagnostic circuit to determine probability distributions of one or more faults in the digital circuit.

9 Claims, 13 Drawing Sheets

```
Algorithm 1: CIRCUITHEALTHSAT
Input   : C_f, the fault-augmented input circuit with fault inputs
          F = {f_1, f_2, ..., f_n}
Input   : α, primary inputs assignment
Input   : β, primary outputs assignment
Output  : R, conditional probabilities of faults
B ← T
for f ∈ F do
 | n[f] ← 0
end
d ← 0
while ω ← SAT(CNF(C_f) ∧ α ∧ β ∧ B) do
 | for f ∈ F do
 |  | if ISFAULT(f) then
 |  |  | n[f] ← n[f] + 1
 |  | end
 |  | B ← B ∧ BLOCKINGCLAUSE(ω)
 |  | d ← d + 1
 | end
end
R ← { n[f]/d : f ∈ F }
return R
```

Algorithm 1: CIRCUITHEALTHSAT

Input : $C_f$, the fault-augmented input circuit with fault inputs $F = \{f_1, f_2, \ldots, f_n\}$

Input : $\alpha$, primary inputs assignment

Input : $\beta$, primary outputs assignment

Output : $R$, conditional probabilities of faults $B \leftarrow T$ for $f \in F$ do

$n[f] \leftarrow 0$ end

$d \leftarrow 0$ while $\omega \leftarrow$ SAT $(\text{CNF}(C_f) \wedge \alpha \wedge \beta \wedge B)$ do for $f \in F$ do if ISFAULT$(f)$ then

$n[f] \leftarrow n[f] + 1$ end

$B \leftarrow B \wedge$ BLOCKINGCLAUSE$(\omega)$ $d \leftarrow d + 1$ end end

$R \leftarrow \left\{ \frac{n[f]}{d} : f \in F \right\}$ return $R$

FIG. 3

400

| $z_1^{sa1}$ | $z_2^{sa1}$ | $z_3^{sa1}$ | $\sigma^{sa1}$ | $c_0^{sa1}$ |
|---|---|---|---|---|
| 0 | 0 | 0 | 0 | 1 |
| 0 | 0 | 1 | 0 | 0 |
| 1 | 0 | 0 | 0 | 0 |
| 0 | 0 | 0 | 1 | 1 |
| 0 | 0 | 1 | 0 | 1 |
| 0 | 0 | 1 | 1 | 0 |
| 0 | 1 | 0 | 1 | 0 |
| 1 | 0 | 0 | 0 | 1 |
| 1 | 0 | 0 | 1 | 0 |
| 1 | 0 | 1 | 0 | 0 |
| 0 | 0 | 1 | 1 | 1 |
| ⋮ | ⋮ | ⋮ | ⋮ | ⋮ |

| $z_1^{sa1}$ | $z_2^{sa1}$ | $z_3^{sa1}$ | $\sigma^{sa1}$ | $c_0^{sa1}$ |
|---|---|---|---|---|
| ⋮ | ⋮ | ⋮ | ⋮ | ⋮ |
| 0 | 1 | 0 | 1 | 1 |
| 0 | 1 | 1 | 1 | 0 |
| 1 | 0 | 0 | 1 | 1 |
| 1 | 0 | 1 | 0 | 1 |
| 1 | 0 | 1 | 1 | 0 |
| 1 | 1 | 0 | 1 | 0 |
| 0 | 1 | 1 | 1 | 1 |
| 1 | 0 | 1 | 1 | 1 |
| 1 | 1 | 0 | 1 | 1 |
| 1 | 1 | 1 | 1 | 0 |
| 1 | 1 | 1 | 1 | 1 |
| $\frac{12}{22}$ | $\frac{8}{22}$ | $\frac{12}{22}$ | $\frac{15}{22}$ | $\frac{12}{22}$ |

FIG. 4

$$H = \frac{1}{\sqrt{2}}\begin{bmatrix} 1 & 1 \\ 1 & -1 \end{bmatrix}$$

$$X = \begin{bmatrix} 0 & 1 \\ 1 & 0 \end{bmatrix}$$

$$CNOT = \begin{bmatrix} 1 & 0 & 0 & 0 \\ 0 & 0 & 0 & 1 \\ 0 & 0 & 1 & 0 \\ 0 & 1 & 0 & 0 \end{bmatrix}$$

$$CCNOT = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \\ 0 & 0 & 0 & 0 & 0 & 0 & 1 & 0 \end{bmatrix}$$

Algorithm 2: MAKEORACLE($C$)

```
Input           : C, the input circuit
Output          : U, the quantum circuit oracle
Local Variables : M, dictionary, Boolean variables to quantum wires map
U ← Ø
C = SORTGATES(C)
for q ∈ {1, 2, . . . , m} do
|  M[q] ← q
end
for g ∈ {1, 2, . . . , n} do
|  switch GATETYPE(G) do
|  |  ψ1 = M[i1], ψ2 = M[i2], . . .
|  |  case Inverter do
|  |  |  U(i) ← CNOT (I ⊗ X) |ψ1 ai⟩
|  |  end
|  |  case AND-gate do
|  |  |  U(i) ← CCNOT |ψ1 ψ2 ai⟩
|  |  end
|  |  case OR-gate do
|  |  |  U(i) ← CCNOT X^2 |ψ1 ψ2 ai⟩
|  |  end
|  |  case XOR-gate do
|  |  |  U(i) ← CNOT (I ⊗ CNOT) |ψ2 ψ1 ai⟩
|  |  end
|  end
|  M[o] = ai
|  i ← i + 1
end
return U
```

FIG. 7

QUANTUM COMPUTING FOR GENERATING ALL DIAGNOSES OF A DIGITAL CIRCUIT

RELATED APPLICATIONS

This application claims the benefit of U.S. Provisional Application No. 63/402,353, titled "QUANTUM ALGORITHM FOR COMPUTING ALL DIAGNOSES OF A SWITCHING CIRCUIT," by inventors Aleksandar B. Feldman, Johan de Kleer, and Ion Matei, filed on 30 Aug. 2022, the disclosure of which is incorporated herein by reference in its entirety.

BACKGROUND

Field

This disclosure is generally related to fault diagnostics of digital circuits. More specifically, this disclosure is related to using quantum computing techniques to generate all diagnoses of a digital circuit.

Related Art

Digital integrated circuits (ICs) are ubiquitous in people's lives, from washing machines to spaceships. Advances in lithography technologies have enabled the feature size of the circuits to decrease continuously, thus facilitating the development of high-density ICs. However, as the feature size decreases, defects (e.g., due to impurities in the substrate, misalignments of masks, trembling during exposure, etc.) in ICs become more common and can lead to the malfunction of the circuits.

Diagnostics of such complex systems can be challenging. Problems in Model-Based Diagnosis (MBD) are often NP-hard or beyond. Quantum computing is a modern and promising approach to solving a range of algorithmic challenges, from breaking cryptographic systems to designing new medicines, and can be a good candidate for solving various circuit diagnostic problems.

SUMMARY

One embodiment provides a method and a system for diagnosing a digital circuit. During operation, the system can obtain a design of the digital circuit, generate a design of a diagnostic circuit by augmenting the design of the digital circuit based on a number of fault-emulating subcircuits, and convert the design of the diagnostic circuit to a design of a quantum oracle circuit. The system can further construct a quantum diagnostic circuit based on the design of the quantum oracle circuit and observe states of the quantum diagnostic circuit to determine probability distributions of one or more faults in the digital circuit.

In a variation on this embodiment, augmenting the design of the digital circuit can include coupling a fault-emulating subcircuit to an output of each logic gate in the digital circuit.

In a further variation, the fault-emulating subcircuit is to emulate one of: a stuck-at-one fault; a stuck-at-zero fault; a wrong-component-type fault; a connection-failure fault; and a bridging fault.

In a variation on this embodiment, converting the design of the diagnostic circuit to the design of the quantum oracle circuit can include representing each primary input of the diagnostic circuit using one qubit and representing each fault input of the diagnostic circuit using one qubit.

In a further variation, converting the design of the diagnostic circuit to the design of the quantum oracle circuit can include replacing a logic gate in the diagnostic circuit with a corresponding quantum subcircuit comprising one or more quantum gates.

In a further variation, the quantum gates can include one or more of a Pauli-X gate, a Hadamard gate, a Controlled NOT (CNOT) gate, and a Controlled Controlled NOT (CCNOT) gate.

In a variation on this embodiment, constructing the quantum diagnostic circuit can include applying a Hadamard gate to a qubit representing a fault input of the diagnostic circuit.

In a variation on this embodiment, observing the states of the quantum diagnostic circuit can include observing the states of the qubit representing the fault input.

In a variation on this embodiment, the system can couple multiple outputs of the diagnostic circuit to a single AND gate, and observing the states of the quantum diagnostic circuit can include observing the states of the qubit representing an output of the AND gate.

In a further variation, the system can collect statistics of the observed states of the quantum diagnostic circuit based on the observed states of the qubit representing the fault input and the observed states of the qubit representing an output of the AND gate.

BRIEF DESCRIPTION OF THE FIGURES

FIG. 3 illustrates the pseudo-codes of a classical algorithm for computing the circuit diagnoses, according to one embodiment of the instant application.

FIG. 4 illustrates a table listing all diagnoses and the conditional fault probabilities for the full adder circuit, according to one embodiment of the instant application.

FIG. 7 illustrates the pseudo codes of an algorithm for creating the quantum oracle circuit from a fault-augmented circuit, according to one embodiment of the instant application.

In the figures, like reference numerals refer to the same figure elements.

DETAILED DESCRIPTION

Figure 1B:
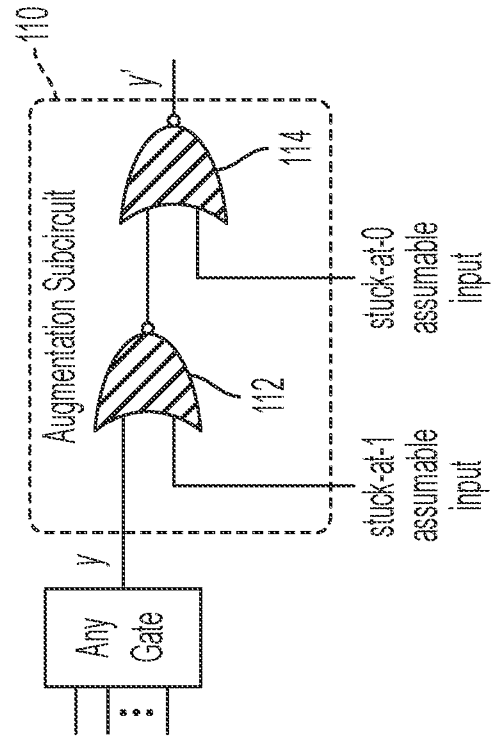
FIG. 1B illustrates an exemplary implementation of augmenting a circuit design to diagnose stuck-at faults, according to one embodiment of the instant application.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

The instant application provides a novel solution to the diagnostic problem of digital circuits. The proposed solution uses a quantum computing system with a plurality of quantum gates to compute, simultaneously, all diagnoses of a digital circuit. More specifically, the quantum computing system can compute a probability distribution function for each possible fault in the digital circuit. To compute the diagnostic solutions using quantum computing techniques, the system can convert a fault-augmented digital circuit into a quantum oracle circuit comprising a plurality of quantum gates coupled to each other via quantum wires that hold the states of the quantum bits (or qubits). When converting the fault-augmented digital circuit into the quantum oracle circuit, the system can represent each primary input using a quantum wire (or qubit) and replace each logic gate with an equivalent quantum subcircuit. To compute the probabilities of all possible faults, a Hadamard gate can be applied to each fault input to place the n unknown fault inputs in superpositions. The diagnostic solution can be obtained by collapsing the states of the quantum system (i.e., by performing measurements).

Fault Augmentation of a Digital Circuit

A digital circuit C can be represented mathematically using a multi-output Boolean function $f_C:[0,1]^m \rightarrow [0,1]^n$. The m arguments of $f_C$ are the primary inputs of C and can be denoted $X=\{x_1, x_2, \ldots, x_m\}$. Similarly, the n results of $f_C$ are the primary outputs of C and can be denoted $Y=\{y_1, y_2, \ldots, y_n\}$.

A digital circuit can include a network of logic gates connected by wires, with each gate implementing a certain (typically small) Boolean function. Common Boolean functions can include negation (NOT or $\neg$), conjunction (AND or $\wedge$), disjunction (OR or $\vee$), exclusive or (XOR or $\oplus$), implication ($\rightarrow$), and logical equivalence ($\leftrightarrow$). The set of elementary Boolean functions can be referred to as the basis of the circuit. Basic logic gates used in digital circuits can include but are not limited to two-input AND, OR, and NOR gates, inverters, etc. Other more complex circuit structures can be implemented by combining one or more basic logic gates. For example, multi-input AND and OR gates can be implemented by chaining the two-input AND and OR gates, respectively; and NAND and NOR gates can be implemented by appending inverters to AND and OR gates, respectively.

In some embodiments, faults in digital circuits can be modeled using fault augmentation, where an original circuit can be converted into a fault-augmented diagnostic circuit by including subcircuits that emulate possible faults (e.g., stuck-at-one and stuck-at-zero faults). Although the stuck-at faults are common faults encountered by digital circuits, other types of faults may also be present in a digital circuit, such as the wrong-component-type faults (e.g., a supposedly OR gate behaves like an AND gate or vice versa), the connection-failure faults (e.g., an open wire), the bridging faults (e.g., a shorted connection to the ground or other wires), etc. Potential faults can be emulated by augmenting the original circuit design using a number of standard components (e.g., logic gates). The fault-augmented diagnostic circuit design can have the same set of primary inputs and outputs as the original circuit design and can include a new set of assumable inputs, which allow a simulation system to simulate the effect of a fault by assigning values to the assumable inputs. In this way, the circuit diagnostic problem becomes the problem of finding the assignment to the assumable inputs that can drive the fault node.

Figure 1A:
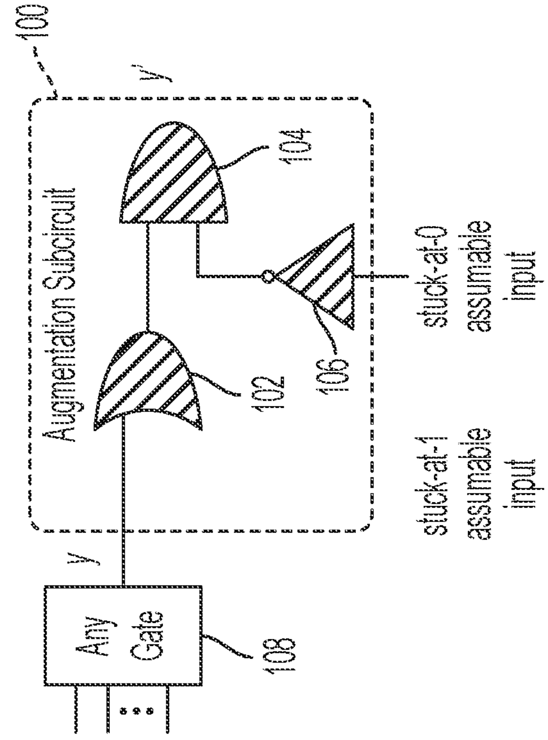
FIG. 1A illustrates an exemplary implementation of augmenting a circuit design to diagnose stuck-at faults, according to one embodiment of the instant application.

FIG. 1A illustrates an exemplary implementation of augmenting a circuit design to diagnose stuck-at faults, according to one embodiment of the instant application. In FIG. 1A, augmentation subcircuit 100 can include an AND gate 102, an OR gate 104, and an inverter 106. When augmentation subcircuit 100 is coupled to the output of a logic gate 108 (which can be any type of logic gate), it can simulate a stuck-at fault occurring at logic gate 108. When the stuck-at-1 assumable input (which is coupled to AND gate 102) is set as 1, the output of augmentation subcircuit 100 will always be 1, regardless of the status of the coupled gate (i.e., logic gate 108). Similarly, when the stuck-at-0 assumable input (which is coupled to inverter 106) is set as 1, the output of augmentation subcircuit 100 will always be 0, regardless of the status of the coupled gate (i.e., logic gate 108). Hence, by setting the stuck-at-1 or stuck-at-0 assumable input, one can emulate, respectively, the stuck-at-1 or stuck-at-0 fault at the coupled gate.

FIG. 1B illustrates an exemplary implementation of augmenting a circuit design to diagnose stuck-at faults, according to one embodiment of the instant application. In FIG. 1B, augmentation subcircuit 110 can include NOR gates 112 and 114, with the stuck-at-1 assumable input coupled to NOR gate 112 and the stuck-at-0 assumable input coupled to NOR gate 114. Note that augmentation subcircuit 100 and augmentation subcircuit 110 are logically equivalent to each other, meaning that for every combination of primary inputs the two circuits produce matching primary outputs. Also note that the number of gates in augmentation subcircuit 110 is fewer than the number of gates in augmentation subcircuit 100. The reduced number of gates can increase the computational efficiency when generating the diagnoses (i.e., identifying the faulty component), considering that an augmentation subcircuit will need to be inserted at the output of each gate in the circuit and at each primary input in order to simulate all possible fault behaviors in the circuit.

Figure 2:
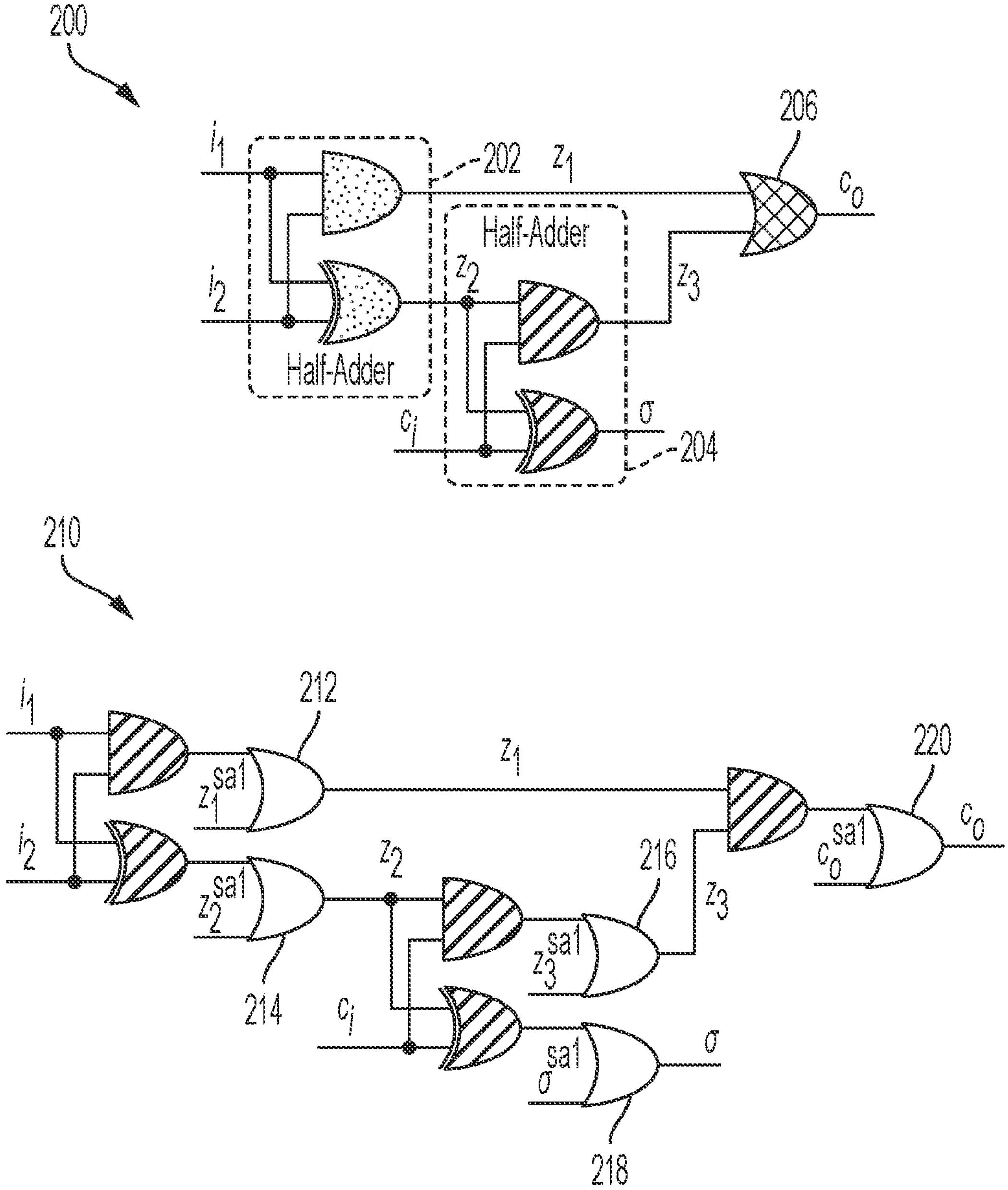
FIG. 2 illustrates an exemplary fault-augmented full-adder circuit, according to one embodiment of the instant application.

In this disclosure, we use the stuck-at-1 fault as an example. FIG. 2 illustrates an exemplary fault-augmented full-adder circuit, according to one embodiment of the instant application. The top drawing of FIG. 2 shows an original full-adder circuit 200 that includes half-adder circuits 202 and 204 and an OR gate 206. Full-adder circuit 200 can be used to add two binary numbers $i_1$ and $i_2$ and a carry input bit $c_i$. The output of the adder can be found in the sum bit σ and the carry output $c_0$. $z_1$, $z_2$, and $z_3$ are internal variables.

The bottom drawing of FIG. 2 shows a fault-augmented full-adder circuit 210. In this example, only the stuck-at-1 faults at the gate outputs are considered. More specifically, fault-augmented full-adder circuit 210 can model the stuck-at-1 faults by inserting an OR gate (e.g., OR gates 212-220) at each possible fault location. The first input of each OR gate can be coupled to the output of a corresponding logic gate in the original circuit. The second input of each OR gate belongs to a special type of input, referred to as an assumable input. In this example, the assumable inputs are $$z_1^{sa1}, z_2^{sa1}, z_3^{sa1}, \sigma^{sa1}, \text{ and } c_o^{sa1},$$

with the superscript sa1 standing for stuck-at-1. Each non-zero assumable input indicates a stuck-at-1 fault at the corresponding location.

Computing a diagnosis of the circuit can be reduced to finding compatible values of a special subset of inputs, the fault inputs (i.e., the assumable inputs defining fault locations). Faults in a circuit often show stochastic behaviors, and a computational framework for probabilities should be established. It has been shown that one can compute the probability of each output from a circuit and the probability of each input. Two algorithms for computing the probabilities of the circuit outputs have been demonstrated: one algorithm first computes all prime implicants of the Boolean function modeling the digital circuit, and the other starts from the inputs and performs real-value arithmetic over the probability values. The second algorithm has polynomial complexity as forward propagation from inputs to outputs can be done easily.

In some embodiments, an NP-complete approach can be used to compute the probabilities of a subset of inputs (e.g., the fault inputs) given the primary inputs and the outputs of a circuit. In one embodiment, a table with all consistent values can be generated, with each row of the table being a diagnosis (i.e., the assignments to the assumable or fault inputs) and each column being a fault variable. The value of the fault variable can be one or zero, with one indicating fault and zero indicating no fault.

Various techniques can be used to compute the fault probabilities. In classical approaches, the conditional fault probabilities can be computed based on satisfiability. Using the fault-augmented full adder circuit 210 (denoted $C_f$) shown in FIG. 2 as an example, the primary input assignments can be denoted $\alpha=\neg i_1 \wedge \neg i_2 \wedge c_i$ (meaning assigning $i_1=i_2=0$ and $c_i=1$), and a double-fault injection at OR gates 218 and 220 can be denoted $$\gamma = \sigma^{sa1} \wedge c_o^{sa1}$$

(meaning $$\sigma^{sa1} = c_o^{sa1} = 1.$$

The primary outputs of circuit 210 can be determined only by the fault γ and can be denoted $\beta=\sigma \wedge c_o$ (meaning $\sigma=c_o=1$). The diagnostic problem becomes the problem of finding satisfiable assignments to the fault inputs.

FIG. 3 illustrates the pseudo-codes of a classical algorithm for computing the circuit diagnoses, according to one embodiment of the instant application. More specifically, Algorithm 1 shown in FIG. 3 calculates the conditional probability $P(f_i|C, \alpha)$ for each $f_i \in F$ using a SAT solver. The algorithm can start with converting a circuit C to a Boolean formula in Conjunctive Normal Form (CNF) and then repetitively call the SAT solver to compute satisfiable solutions, which are also the diagnoses for the circuit. After each call to the SAT subroutine, a row can be added to a table, from which the conditional probability can be computed. In addition to adding the row, a blocking clause can also be added to prevent the satisfiable solution ω from being counted again.

FIG. 4 illustrates a table listing all diagnoses and the conditional fault probabilities for the full adder circuit, according to one embodiment of the instant application. As can be seen from FIG. 4, a truth table 400 can include five columns, with each column representing one of the five fault variables representing the five potential faults. Each row in truth table 400 can correspond to a diagnosis, which specifies the faulty component(s) in the circuit. Note that the last row of the truth table includes all ones, meaning that all components in the circuit are faulty. The conditional probability of each fault can be computed based on truth table 400. For example, there are 22 rows in truth table 400, and the first column (i.e., fault variable $$z_1^{sa1})$$

includes 12 ones. Accordingly, the fault probability for the corresponding component (i.e., the gate coupled to OR gate 212 in circuit 210) can be 12/22. This means, given the inputs/outputs of the circuit, the likelihood of the output of this gate to stuck at 1 is 12/22. The fault probabilities of other components can be computed similarly. Note that the 22 rows of truth table 400 correspond to 22 possible diagnoses for the given inputs/outputs. In this example, the distribution of the diagnoses can resemble binomial as there is relatively little masking in the full-adder circuit.

FIG. 4 shows the truth table generated using Algorithm 1 shown in FIG. 3. In practice, it may not be necessary to explicitly create the truth table. In some embodiments, instead of creating a truth table, the circuit diagnostic system can maintain a set of counters for the fault variables. These counters can be denoted $n[f]$, $f \in F$, where F is the set of fault variables. The total number of satisfiable assignments (diagnoses) can be kept by a counter d. The diagnostic system can compute the probability of a fault $f$ by dividing the corresponding $n[f]$ by the total number of diagnoses d.

Quantum-Computing-Based Fault Diagnostic System

As discussed previously, faults in complex systems can be stochastic, making quantum computing an ideal candidate for solving the diagnostic problem in a complex system, because the result of a quantum computation is always a probability distribution function. In some embodiments, a quantum-computing-based diagnostic system can build an equivalent quantum circuit to compute all diagnoses of a digital circuit.

Although, on the surface, quantum circuits can be similar to digital circuits as they both include gates connected by wires, there are multiple important differences between a quantum circuit and a digital circuit. One important difference is that, while the state of a digital circuit is a Boolean vector over all wires, the state of a quantum circuit is a superposition of all quantum bits (or qubits).

A quantum circuit can include a set of quantum wires $\psi_1$, $\psi_2$, . . . , $\psi_n$ (one wire per qubit) that connect a number of quantum gates. A quantum gate is a basic quantum circuit operating on a small number of qubits carried by the quantum wires. Unlike metal wires in classical digital circuits, quantum wires do not have to be metal wires. A quantum wire can be any medium that can carry a qubit and can be, for example, laser light, or even some passage of time.

The simplest quantum circuit can include a quantum wire $\psi_1$ carrying a single qubit and one or more quantum gates that act on this single qubit. The state of the quantum circuit can be represented using the Dirac or Braket notation as $|\psi\rangle = \alpha|0\rangle + \beta|1\rangle$, where $\alpha, \beta \in \mathbb{C}$. In this disclosure, all kets are vectors of size two, where $|0\rangle$ is $$\begin{bmatrix} 1 \\ 0 \end{bmatrix},$$

and $|1\rangle$ is $$\begin{bmatrix} 0 \\ 1 \end{bmatrix}.$$

The state of a quantum circuit with two qubits (or two quantum wires) is the superposition with four terms: $|\psi_1\psi_2\rangle = \alpha_{00}|00\rangle + \alpha_{01}|01\rangle + \alpha_{10}|10\rangle + \alpha_{11}|11\rangle$, where $\alpha_{00}$, $\alpha_{01}$, $\alpha_{10}$, $\alpha_{11} \in \mathbb{C}$.

Figure 5:
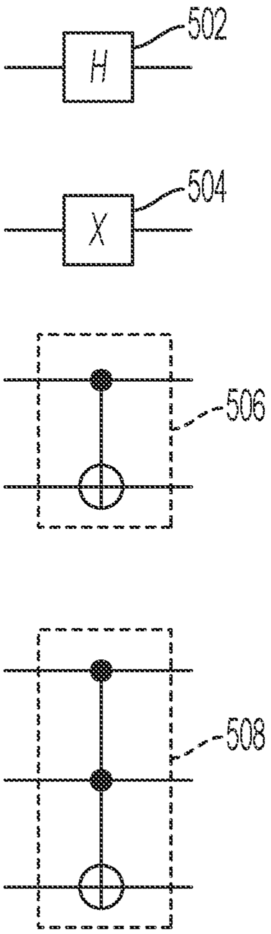
FIG. 5 illustrates different types of quantum gates included in a quantum diagnostic circuit, according to one embodiment of the instant application.

FIG. 5 illustrates different types of quantum gates included in a quantum diagnostic circuit, according to one embodiment of the instant application. More specifically, FIG. 5 shows the symbols and corresponding matrices of a Hadamard gate or H gate 502, a Pauli-X gate 504, a Controlled Not (CNOT) gate 506, and a Toffoli or Controlled Controlled NOT (CCNOT) gate 508.

Hadamard gate 502 acts on a single qubit (or is connected to a single quantum wire) and maps the basis state $|0\rangle$ to $$\frac{|0\rangle + |1\rangle}{\sqrt{2}}$$

and basis state $|1\rangle$ to $$\frac{|0\rangle - |1\rangle}{\sqrt{2}},$$

thus creating an equal superposition of the two basis states.

Pauli-X gate 504 acts on a single qubit and is the quantum equivalent of a NOT gate in classical digital circuits with respect to the standard basis ($|0\rangle$, $|1\rangle$). More specifically, Pauli-X gate 504 can map basis state $|0\rangle$ to $|1\rangle$ and basis state $|1\rangle$ to $|0\rangle$.

Controlled Not (CNOT) gate 506 and Toffoli or CCNOT gate 508 can act on two or more (obits, where one or more qubits can function as a control for some operation. For example, CNOT gate 506 can act on two qubits and performs the NOT operation on the second qubit only when the first qubit is $|1\rangle$ and otherwise leaves the second qubit unchanged. CCNOT gate 508 is related to the classical AND and XOR operations as it performs the mapping $|a,b,c\rangle \mapsto |a,b,c\oplus(a\wedge b)\rangle$ on states in the computational basis.

A Hilbert space representing a quantum system must satisfy the normalization condition. Accordingly, the inner product of a vector with itself is equal to one (i.e., $\langle\psi|\psi\rangle = 1$. The length of a vector in a particular direction represents the "probability amplitude" of the quantum system. In some embodiments, to apply the quantum computing principle to the circuit diagnostic problem, one can create a quantum oracle circuit that is analogous to the fault-augmented circuit of a to-be-diagnosed digital circuit. "Quantum oracle" is a term used in the realm of quantum computing to refer to a black box that performs certain operations. In this disclosure, the quantum oracle circuit can be considered the quantum equivalent of the classical circuit. All assumable inputs in the quantum oracle circuit can be set as a superposition of $|0\rangle$ and $|1\rangle$. The collapsed probability amplitude circuit readout is the a posteriori probability distribution function of each fault given the observation $\alpha$ and the circuit $\varphi$. Note that the observation includes both the primary inputs and the primary outputs.

Figure 6:
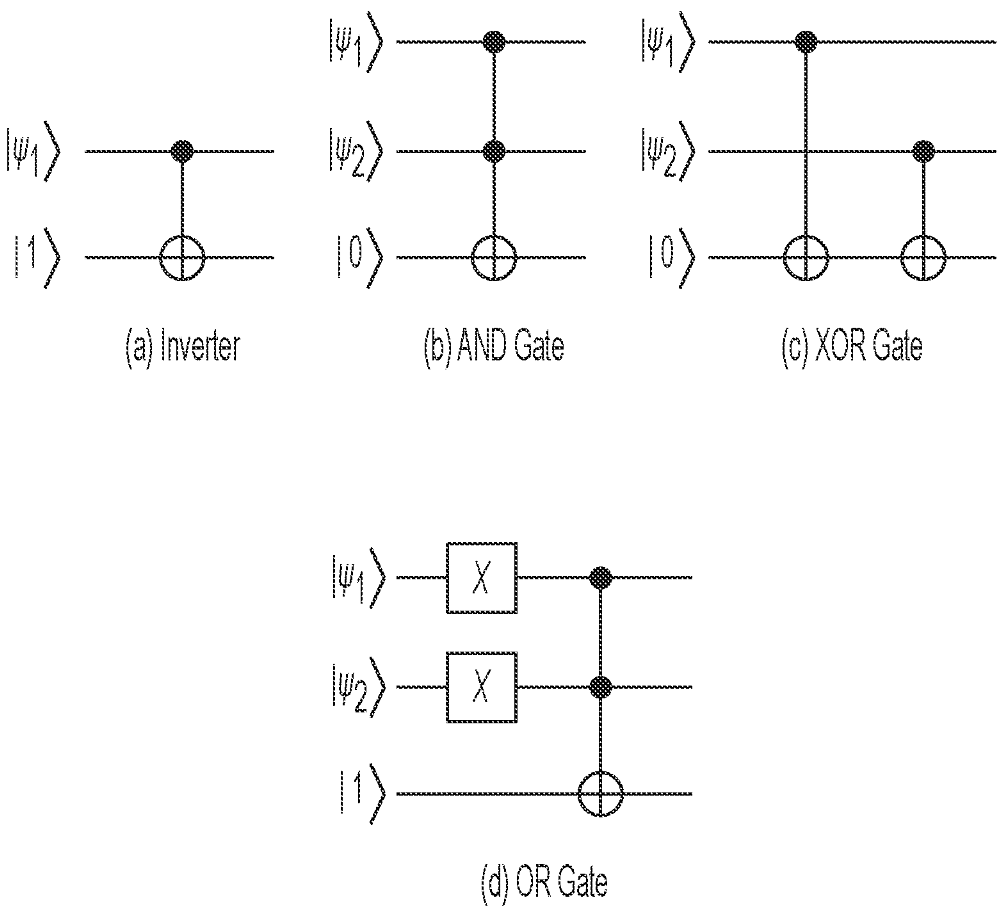
FIG. 6 illustrates a number of quantum subcircuits corresponding to a number of classical logic gates, according to one embodiment of the instant application.

In some embodiments, creating the quantum oracle circuit can include adding a quantum wire for each primary input of the to-be-diagnosed circuit and replacing each classical logic gate (e.g., AND, OR, NOT, XOR, etc.) with an equivalent quantum subcircuit. FIG. 6 illustrates a number of quantum subcircuits corresponding to a number of classical logic gates, according to one embodiment of the instant application. More specifically, FIG. 6 illustrates that the quantum subcircuit equivalent of a classical inverter can include a CNOT gate with the control qubit set as $|1\rangle$; the quantum subcircuit equivalent of a classical AND gate can include a CCNOT gate with the control qubit set as $|0\rangle$; the quantum subcircuit equivalent of a classical XOR gate can include two CNOT gates; and the quantum subcircuit equivalent of a classical OR gate can include a CCNOT gate and two Pauli-X gates.

FIG. 7 illustrates the pseudo-codes of an algorithm for creating the quantum oracle circuit from a fault-augmented circuit, according to one embodiment of the instant application. The input to the algorithm can be the design of a classical digital circuit. The output of the algorithm can be the design of a quantum oracle circuit U. Note that the algorithm can create a quantum oracle circuit based on any classical digital circuit. For the purpose of diagnosing faults in a digital circuit, the input to the algorithm can include a fault-augmented circuit. In some embodiments, before converting the fault-augmented classical circuit into the quantum oracle circuit, one should first convert the multi-output fault-augmented classical circuit into a single-output circuit. This single-output circuit can include the values of the observed primary outputs P. In one embodiment, each primary output of the multi-output circuit can be fed into a multi-input AND gate. The multiple primary outputs can either go directly into the inputs of the AND gate or through inverters, depending on the observed values of $\beta$. More specifically, primary outputs corresponding to zeros are inverted before sending to the AND gate. This way, if the outputs of the circuit match the observed values of $\beta$, the output of the AND gate is one; otherwise, the output of the AND gate is zero.

Operations in the algorithm can include sorting all logic gates in the fault-augmented circuit (e.g., circuit 210 shown in FIG. 2). In some embodiments, sorting the logic gates can include performing a graph traversal from the primary inputs of the circuit and proceeding toward the primary outputs of the circuit (e.g., from the left side to the right side of circuit 210). The algorithm can also record the correspondence between the fault-augmented classical circuit wires (e.g., the primary inputs) and the qubits (e.g., the quantum wires) in the quantum oracle circuit. The correspondence can be stored in a data structure M, referred to as a dictionary. More specifically, during the initialization phase, the algorithm can create one qubit for each primary input and for each fault input (or assumable input) and store the one-to-one mapping in M.

While generating the quantum oracle circuit design, the algorithm can replace each classical logic gate with a corresponding quantum subcircuit. Exemplary corresponding relationships between classical logical gates and quantum subcircuits are shown in FIG. 6. When generating the quantum oracle circuit, information on the input wires should be preserved to allow it to be reused by downstream gates. This can be done by adding a new ancillary qubit $a_i$ corresponding to the output of each logic gate. The mapping between the ancillary qubits and variables in the classical circuit can also be stored in M.

Figure 8:
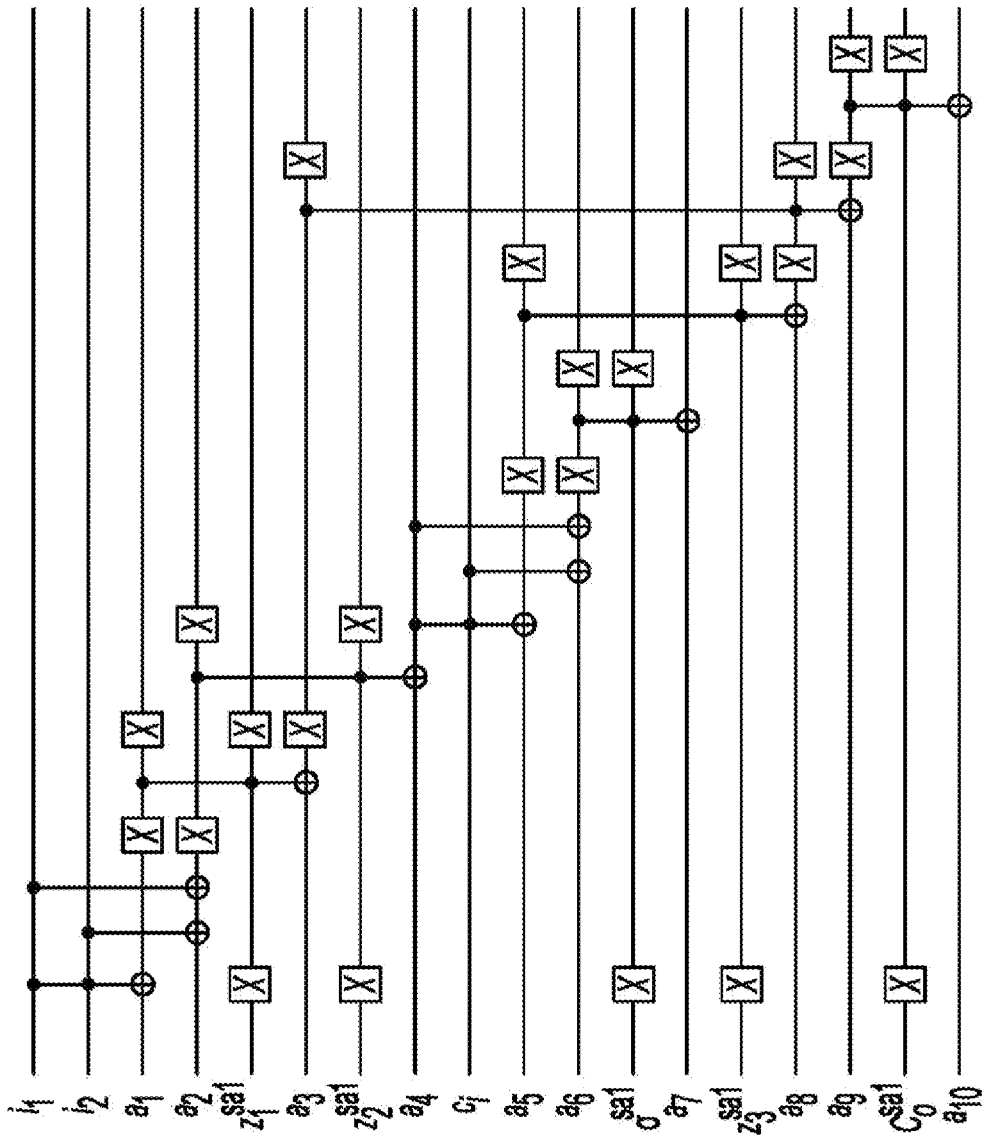
FIG. 8 illustrates an exemplary quantum oracle circuit generated based on a fault-augmented full-adder circuit, according to one embodiment of the instant application.

FIG. 8 illustrates an exemplary quantum oracle circuit generated based on a fault-augmented full-adder circuit, according to one embodiment of the instant application. More specifically, FIG. 8 shows a quantum oracle circuit 800 generated based on fault-augmented classical circuit 210 shown in FIG. 2. As can be seen from FIG. 8, the qubits (or quantum wires) in quantum oracle circuit 800 can include qubits representing the primary inputs (e.g., $i_1$, $i_2$, and $c_i$), qubits representing the fault or assumable inputs $$\left(\text{e.g., } z_1^{sa1},\ z_2^{sa1},\ z_3^{sa1},\ \sigma^{sa1}, \text{ and } c_o^{sa1}\right),$$

and ancillary qubits (e.g., $a_1$, $a_2$, . . . , $a_{10}$).

Once a design of the quantum oracle circuit (denoted U) is generated, one can use such design to construct a quantum diagnostic circuit to directly compute the conditional probability of each fault in a digital circuit, given the input/output of the digital circuit. To do so, each of the n unknown fault inputs (e.g., n[$f$], $f \in F$) can be put into a superposition of $|0\rangle$ and $|1\rangle$ by applying a Hadamard gate. In one example, the primary inputs can be initialized as $|0\rangle$ or $|1\rangle$, corresponding to the Boolean values of the input assignment α.

Figure 9:
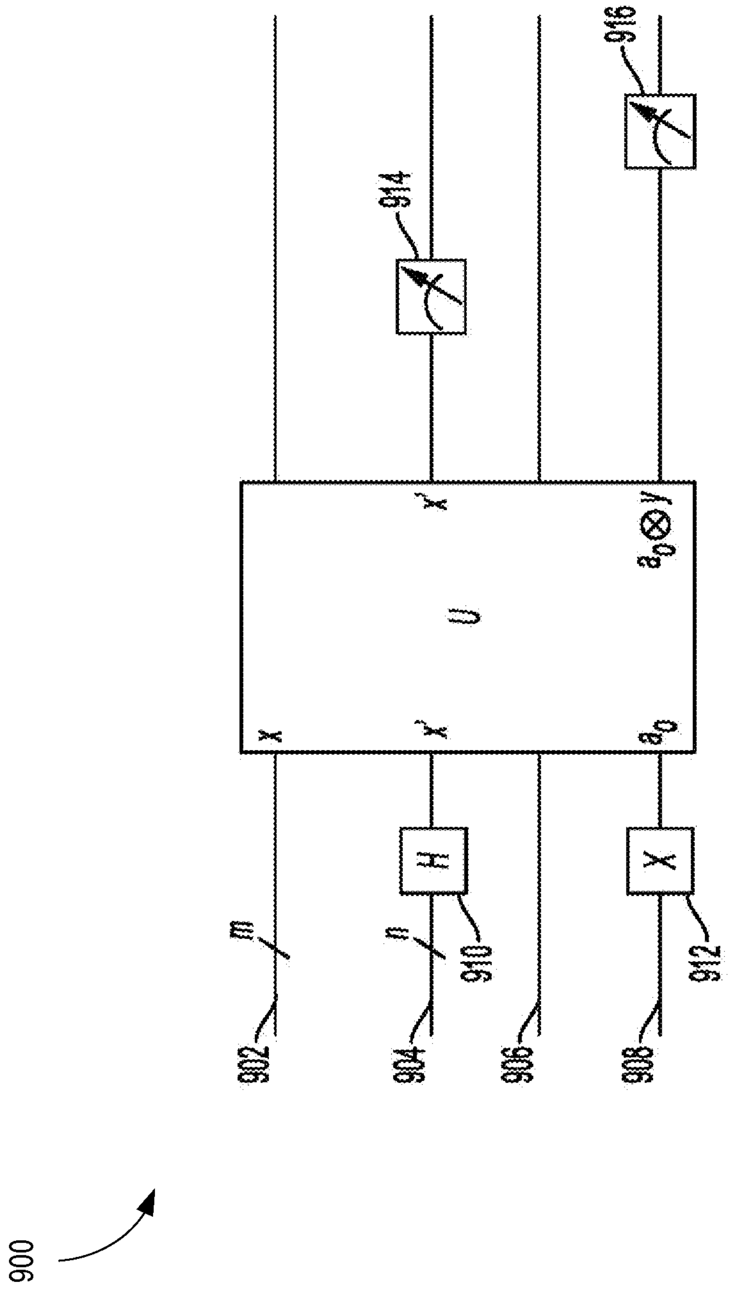
FIG. 9 illustrates the exemplary quantum algorithm for generating all diagnoses of a digital circuit, according to one embodiment of the instant application.

According to the principle of quantum mechanics, the collapsed state of the quantum diagnostic circuit can be obtained by performing measurements on the quantum circuits. More particularly, given the assignment of the primary inputs, measurements can be performed on the qubits representing the fault inputs as well as the qubit representing the output. In this example, the circuit has a single output due to the AND gate. FIG. 9 illustrates the exemplary quantum algorithm for generating all diagnoses of a digital circuit, according to one embodiment of the instant application. In the example shown in FIG. 9, a quantum oracle circuit 900 can include m primary-input qubits 902, n fault-input qubits 904, a number of ancillary qubits 906, and an output qubit 908. A Hadamard gate 910 is applied to each fault-input qubit, and a Pauli-X gate 912 is applied to the output qubit. Measurements (indicated by symbols 914 and 916) can be performed for the fault-input qubits and the output qubit.

In some embodiments, a quantum system (which can include the quantum oracle circuit, the Hadamard gates, and the Paul-X gate) according to FIG. 9 can be constructed using known quantum computing technologies (e.g., implementing superconductor-based or optical-based quantum gates). Measurements 914 and 916 can be repeated many times, and each measurement result is the collapsed state of the quantum system. By collecting the measurement statistics, one can obtain the probability distribution function over all possible combinations of values for the fault inputs and the single output of the system. Note that the answer to the diagnostic problem is taken only from the measurements that result in positive values of the combined output o (e.g., $a_o=1$ in FIG. 9). Alternatively, if there lacks a sufficient amount of probability mass in the positive values of the combined output, the result can be marginalized from ¬o. In this case, the probability of each gate being healthy as opposed to being faulty is obtained first.

Figure 10:
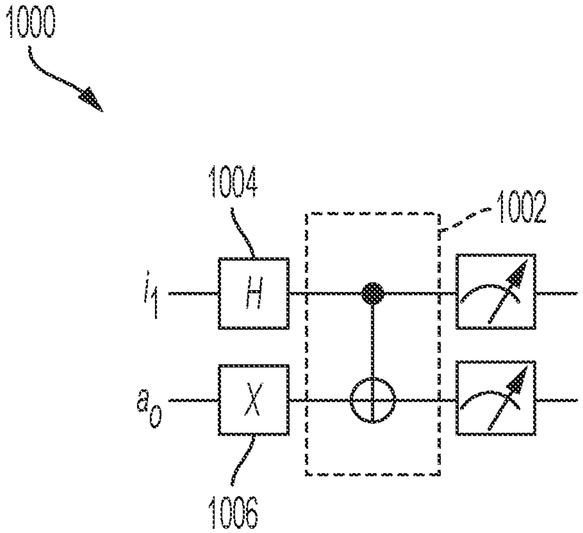
FIG. 10 illustrates an exemplary diagnostic quantum circuit corresponding to a single inverter, according to one embodiment of the instant application.

FIG. 10 illustrates an exemplary diagnostic quantum circuit corresponding to a single inverter, according to one embodiment of the instant application. In this example, a diagnostic quantum circuit 1000 can be used to compute the diagnostic solution for a single inverter with an input $i_1$ and an output $a_o$ that is known to be true. Diagnostic quantum circuit 1000 includes a CNOT gate 1002 with two qubits, an input qubit $i_1$ and an output qubit $a_o$. A Hadamard gate 1004 is applied to the input qubit, and a Pauli-X gate 1006 is applied to the output qubit. Because diagnostic quantum circuit 1000 only includes two qubits, its state can be fully described by a complex vector of size four. In this disclosure, an assumption on the initial state and the unitary transformations is that the imaginary parts of all complex numbers are always zero.

The unitary matrix of quantum circuit 1000 can be expressed as:

$$(X \otimes H)CNOT = \frac{1}{\sqrt{2}}\begin{bmatrix} 0 & 0 & 1 & 1 \\ 0 & 0 & 1 & -1 \\ 1 & 1 & 0 & 0 \\ 1 & -1 & 0 & 0 \end{bmatrix}\begin{bmatrix} 1 & 0 & 0 & 0 \\ 0 & 0 & 0 & 1 \\ 0 & 0 & 1 & 0 \\ 0 & 1 & 0 & 0 \end{bmatrix} = \frac{1}{\sqrt{2}}\begin{bmatrix} 0 & 0 & 1 & 1 \\ 1 & -1 & 0 & 0 \\ 1 & 1 & 0 & 0 \\ 0 & 0 & 1 & -1 \end{bmatrix}.$$

Multiplying the above unitary matrix with the initial state $[1\ 0\ 0\ 0]^T$ can result in the final state of quantum circuit 1000: $1/\sqrt{2}[0\ 1\ 1\ 0]^T$. The final state can be expressed using Dirac's notation as $1/\sqrt{2}|01\rangle + 1/\sqrt{2}|10\rangle$. After collapsing the state (e.g., by performing the measurements), the resulting probability distribution is $\Pr(|01\rangle)=\Pr(|10\rangle)=\frac{1}{2}$. According to FIG. 10, the first qubit corresponds to the inverter's input $i_1$, and the second qubit corresponds to the value of the inverter's global output $a_o$. This means that when computing the probability mass function of input $i_1$, one only needs to consider the measurement probabilities in which $a_o=1$. This leaves us only with $\Pr(|01\rangle)=\frac{1}{2}$, which can lead to $\Pr(i=1)=0$, meaning that it is impossible for the input to be one. Given that the output is one, such a result is consistent with the truth table of the inverter gate.

Figure 11:
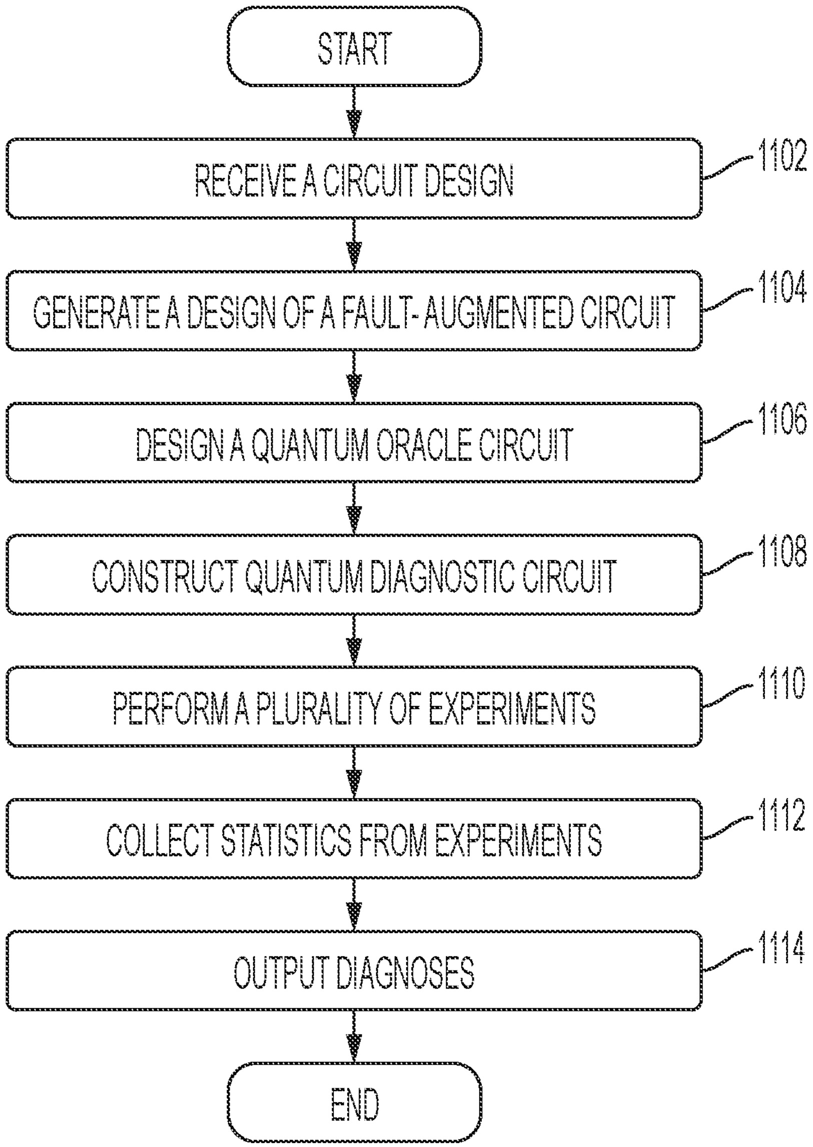
FIG. 11 presents a flowchart illustrating an exemplary quantum-based circuit diagnostic process, according to one embodiment of the instant application.

FIG. 11 presents a flowchart illustrating an exemplary quantum-based circuit diagnostic process, according to one embodiment of the instant application. During operation, the diagnostic system can receive the design of a to-be-diagnosed digital circuit (operation 1102). The circuit design is assumed to have no fault (i.e., it is properly designed) and can be in the form of a hardware layout or a netlist. The system can then generate a design of a fault-augmented circuit based on the circuit design and a number of fault-emulating subcircuits (operation 1104). The fault-emulating subcircuits can be used to emulate different types of faults, including but not limited to stuck-at faults, wrong-component-type faults, bridging faults, and open-wire faults. Generating the fault-augmented circuit can include inserting a fault-emulating subcircuit at the output of each gate in the original circuit and/or at each primary input of the original circuit. In some embodiments, to diagnose the stuck-at-one faults, the system can design a fault-augmented circuit by inserting a subcircuit emulating the stuck-at-one fault at the output of each gate.

Subsequently, the system can design a quantum oracle circuit based on the fault-augmented circuit (operation 1106). Designing the quantum oracle circuit can include sorting the logic gates in the fault-augmented circuit, replacing each logic gate with a corresponding quantum subcircuit, and storing the mapping relationships between the classical variables (i.e., the Boolean input/output of each gate) in the fault-augmented circuit and the quantum variables (or qubits) in the quantum oracle circuit. In addition to qubits representing the primary inputs, the assumable inputs (or fault inputs), and the primary outputs, the quantum variables (i.e., qubits) in the quantum oracle circuit can also include ancillary qubits. In one embodiment, each ancillary qubit can correspond to an output of a corresponding logic gate. In some embodiments, before being converted into the quantum oracle circuit, a multi-output fault-augmented circuit can first be converted into a single-output circuit by coupling all of its primary outputs to an AND gate. Depending on whether an observed bit value is zero or one, the corresponding output may be fed to the AND gate via an inverter or directly, respectively.

Based on the quantum oracle circuit, the diagnostic system can construct a quantum diagnostic circuit (operation 1108). Constructing the quantum diagnostic circuit can include applying a Hadamard gate to each fault input, thus achieving the goal of placing the fault input in a superposition. By placing all fault inputs in superpositions, the diagnostic system can determine the conditional probability distribution functions of all potential faults in the to-be-diagnosed circuit (e.g., the faults corresponding to the fault-emulating subcircuits in the fault-augmented circuit). Constructing the quantum diagnostic circuit can also include adding measurement units for those qubits representing the fault inputs and the circuit output.

Once the quantum diagnostic circuit is constructed, the diagnostic system can perform a plurality of experiments or observations using the quantum diagnostic circuit (operation 1110). While performing the experiments or observing the states of the quantum diagnostic circuit, the diagnostic system can assign the primary inputs to predetermined values. In some examples, the diagnostic system can assign all ones or all zeros to the primary inputs. In an alternative example, the diagnostic system can assign random values to the primary inputs. Note that the diagnostic system can also observe the behavior of the to-be-diagnosed physical circuit. For example, the diagnostic system can observe the primary outputs of the physical circuit responsive to the primary inputs with assigned values. Performing an experiment on the quantum circuit can include measuring the states of the qubits representing the fault inputs and the primary outputs, which can cause those states to collapse according to the probability distribution function of the corresponding fault. For example, for the given primary input and output values, the probability of a qubit representing a fault input collapsing to the $|1\rangle$ state can indicate the likelihood of the corresponding gate being faulty. In some embodiments, instead of running experiments using an actual quantum system (e.g., a quantum diagnostic circuit with various quantum gates), it is also possible to simulate the behavior of the quantum system on a classical computer. Note that, even being simulated on a classical computer, the quantum algorithm can still outperform the classical SAT-based circuit-diagnostic techniques (e.g., the algorithm shown in FIG. 3) in terms of efficiency and scalability.

To reduce statistical error, the diagnostic system can perform a large number of experiments. The diagnostic system can collect statistics from those experiments to determine the probability distribution function associated with each fault (operation 1112) or the faulty likelihood of each gate. In some embodiments, collecting the statistics can include computing the probability distribution function of a particular state ($|0\rangle$ or $|1\rangle$) of each fault input. For example, the diagnostic system can count the number of times the measured state of a fault input being $|1\rangle$ and then divide it by the total number of measurements to obtain the faulty probability of the corresponding gate. While collecting the statistics, the diagnostic system only considers the measurement results with the measured output state matching the observed output of the physical circuit. For example, for a given set of assignments to its primary inputs, the physical circuit can generate a set of primary outputs. The set of primary outputs can be mapped to the state of the output of the quantum diagnostic circuit. Different runs of the experiment may result in different states of the output. However, only the runs that result in the state of the output matching the observed primary outputs of the physical circuit would be considered, because they represent the behavior of the physical circuit. In one embodiment, because the quantum oracle circuit is constructed by sending the multiple primary outputs of the to-be-diagnosed circuit to an AND gate either directly or via inverters, the output of the quantum oracle circuit matches the observed output of the to-be-diagnosed if, and only if, the state of its output (i.e., the output of the AND gate) is $|1\rangle$.

The diagnostic system can subsequently output the diagnoses (operation 1114). The diagnoses can include the probability distribution functions of all potential faults in the circuit. Note that the diagnostic system may perform experiments or measurements using the quantum diagnostic circuit based on one set of observed circuit inputs/outputs or based on multiple sets of observed circuit inputs/outputs. For each set of observed inputs/outputs, different quantum oracle circuits may be generated, because the coupling to the final AND gate may vary for different observed values of the primary outputs.

Figure 12:
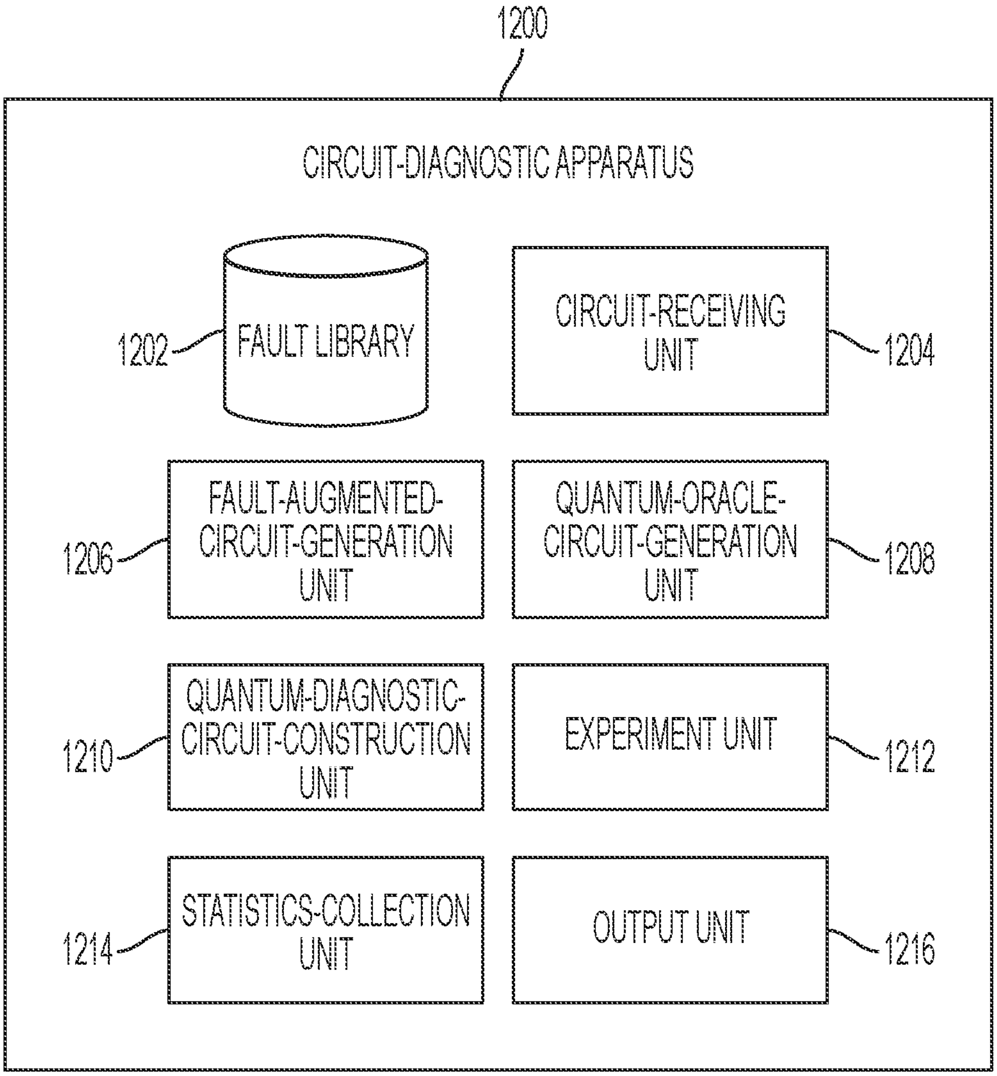
FIG. 12 illustrates an exemplary circuit-diagnostic apparatus based on quantum computing, according to one embodiment of the instant application.

FIG. 12 illustrates an exemplary circuit-diagnostic apparatus based on quantum computing, according to one embodiment of the instant application. Circuit-diagnostic apparatus 1200 can include a fault library 1202 a circuit-receiving unit 1204, a fault-augmented-circuit-generation unit 1206, a quantum-oracle-circuit-generation unit 1208, a quantum-diagnostic-circuit-construction unit 1210, an experiment unit 1212, a statistics-collection unit 1214, and an output unit 1216.

Fault library 1202 stores the fault-augmented subcircuits for various types of faults, including but not limited to the stuck-at faults, the wrong-component-type faults, the bridging faults, and the open-wire faults. Circuit-receiving module 1204 receives a to-be-diagnosed digital circuit. In some embodiments, circuit-receiving module 1204 can receive the design (e.g., the layout) of the circuit. It is assumed that the to-be-diagnosed physical circuit is manufactured according to the design. In further embodiments, circuit-receiving module 1204 can also receive the testing results (e.g., inputs and the corresponding outputs) of the circuit. In addition to a digital circuit, circuit-receiving module 1204 can receive the design of a physical system or a computational system of a different type, such as a mechanical system, an analog circuit, an electro-optical system, an electro-mechanical system, a processor, a reversible computing circuit, a quantum circuit, an optical circuit, a quantum optical circuit, a computer program, etc. Depending on the type of physical system, the received design can have a different format. For example, for a mechanical or an optical system, the design can be a model (e.g., a mathematical model) of the system; and for a computer program, the design can be logic expressions. In addition, depending on the type of physical system being diagnosed, fault library 1202 can include different types of faults.

Fault-augmented-circuit-generation module 1206 can generate the design of a fault-augmented circuit based on the fault-emulating subcircuits included in fault library 1202. For example, to diagnose a particular type of fault (e.g., the stuck-at-one fault), a fault-augmented circuit can be generated by inserting a corresponding fault-emulating subcircuit at the output of each logic gate in the original circuit. Quantum-oracle-circuit-generation unit 1208 can generate a quantum equivalent of the classical fault-augmented circuit, referred to as a quantum oracle circuit. While generating a design of the quantum oracle circuit, quantum-oracle-circuit-generation unit 1208 can represent the primary inputs/outputs and the fault inputs using qubits and also add an ancillary qubit for each gate output. Quantum-oracle-circuit-generation unit 1208 can replace each classical logic gate with a corresponding quantum subcircuit.

Quantum-diagnostic-circuit-construction unit 1210 can construct a quantum diagnostic circuit based on the design of the quantum oracle circuit. In some embodiments, quantum-diagnostic-circuit-construction unit 1210 can use standard quantum computing technologies (e.g., superconductor-based or laser-based technologies) to construct a physical diagnostic circuit comprising various types of quantum gates, such as Hadamard gates, Pauli-X gates, CNOT gates, CCNOT gates, etc. More specifically, the diagnostic circuit can be constructed according to the design of the quantum oracle circuit (e.g., by applying Hadamard gates to the fault inputs and adding measurement units at the fault inputs and the circuit output).

Experiment unit 1212 can perform experiments (e.g., taking measurements) on the quantum diagnostic circuit. Each measurement can cause the quantum states of the qubits representing the fault inputs to collapse. The probability of each state can correspond to the probability of the gate being faulty or healthy. Experiment unit 1212 can be configured to perform many experiments to reduce the error in determining the probability distribution function of each fault. Statistics-collection unit 1214 can collect the statistics of the measured states from the experiments. Only those experiments with their output state matching the observed outputs of the digital circuit would be considered. Output unit 1216 can output the diagnoses (e.g., the probability distribution of each fault) of the digital circuit.

Figure 13:
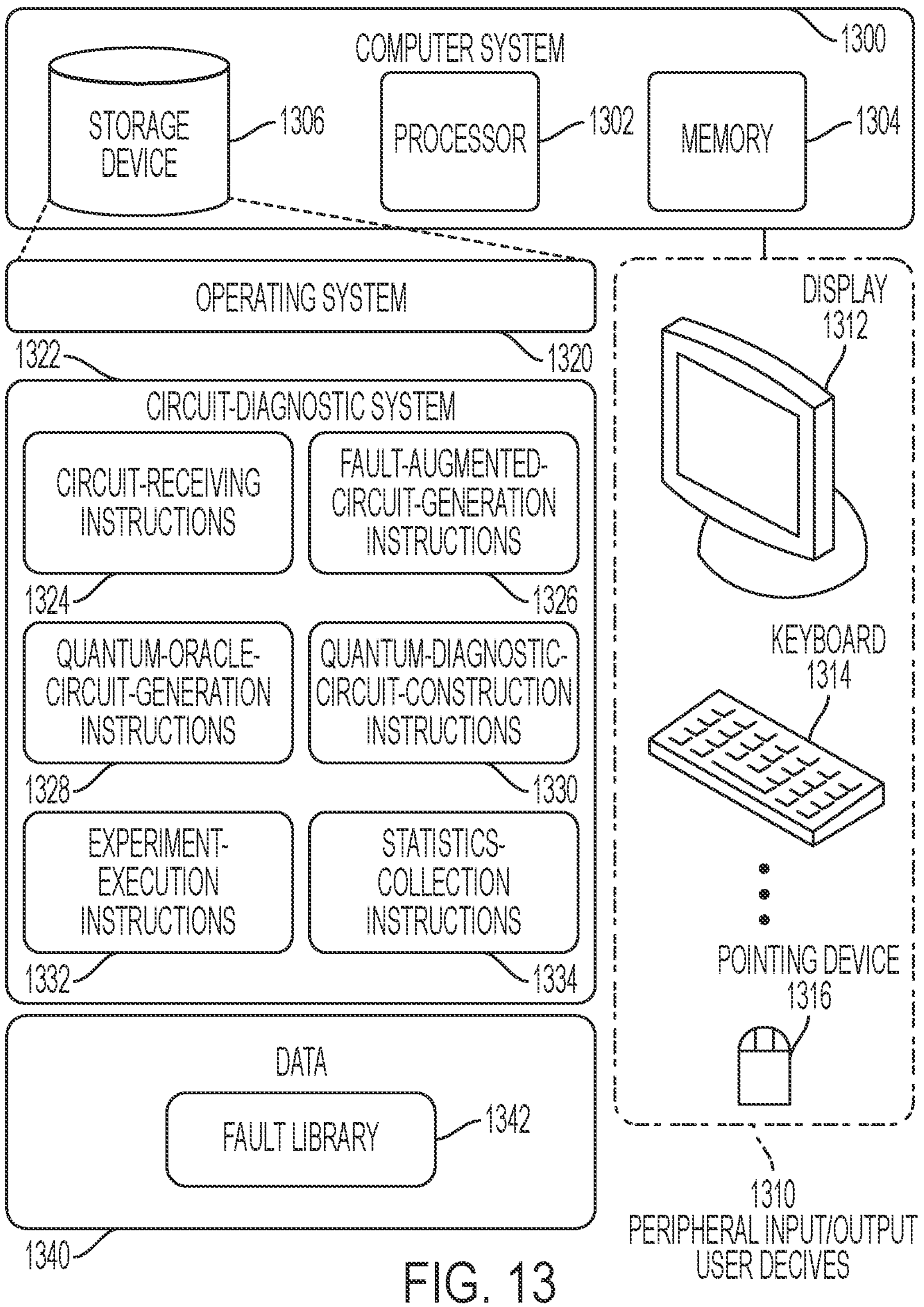
FIG. 13 illustrates an exemplary computer system that facilitates quantum-computing-based diagnostics of digital circuits, according to one embodiment of the instant application.

FIG. 13 illustrates an exemplary computer system that facilitates quantum-computing-based diagnostics of digital circuits, according to one embodiment of the instant application. Computer system 1300 includes a processor 1302, a memory 1304, and a storage device 1306. Furthermore, computer system 1300 can be coupled to peripheral input/output (I/O) user devices 1310, e.g., a display device 1312, a keyboard 1314, and a pointing device 1316. Storage device 1306 can store an operating system 1320, a circuit-diagnostic system 1322, and data 1340.

Circuit-diagnostic system 1322 can include instructions, which when executed by computer system 1300, can cause computer system 1300 or processor 1302 to perform methods and/or processes described in this disclosure. Specifically, circuit-diagnostic system 1322 can include instructions for receiving a to-be-diagnosed circuit (circuit-receiving instructions 1324), instructions for generating a fault-augmented circuit (fault-augmented-circuit-generation instructions 1326), instructions for generating a quantum oracle circuit (quantum-oracle-circuit-generation instructions 1328), instructions for constructing a quantum diagnostic circuit (quantum-diagnostic-circuit construction instructions 1330), instructions for executing experiments using the quantum diagnostic circuits (experiment-execution instructions 1332), and instructions for collecting statistics from the experiment results (statistics-collection instructions 1334). Data 1340 can include a fault library 1342.

In general, the disclosed embodiments can provide a system and method for diagnosing digital circuits using quantum computing technologies. By placing the qubits modeling the circuit faults in superpositions, the conditional probability distribution function of each fault can be obtained by collapsing the states of a quantum system equivalent to the digital circuit. Compared with existing approaches based on classical SAT solvers, the disclosed solution can provide higher computational efficiency and scalability, even when the quantum circuit is being simulated on a classical computer.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for diagnosing a classical digital circuit, the method comprising:

obtaining, by a computer, a design of the classical digital circuit;

generating a design of a diagnostic circuit by augmenting the design of the classical digital circuit based on a number of fault-emulating subcircuits, wherein the diagnostic circuit comprises a set of primary inputs, a set of fault inputs corresponding to potential fault locations in the classical digital circuit, a plurality of classical logic gates, and a set of primary outputs, and wherein augmenting the design of the digital circuit comprises coupling a fault-emulating subcircuit to an output of each logic gate in the digital circuit;

converting the design of the diagnostic circuit to a design of a quantum oracle circuit, comprising:

replacing each classical logic gate in the diagnostic circuit with an equivalent quantum subcircuit and representing the primary and fault inputs using qubits; and creating one or more ancillary qubits corresponding to outputs of logic gates in the diagnostic circuit; and constructing a quantum diagnostic circuit based on the design of the quantum oracle circuit by applying a Hadamard gate to qubits representing fault inputs of the diagnostic circuit;

coupling multiple outputs of the diagnostic circuit to a single AND gate;

observing states of the quantum diagnostic circuit to determine probability distributions of one or more faults in the classical digital circuit, wherein observing the states of the quantum diagnostic circuit comprises observing states of qubits representing the fault inputs and states a qubit representing an output of the AND gate; and collecting statistics of the observed states of the quantum diagnostic circuit based on the observed states of qubits representing the fault inputs and the observed states of the qubit representing the output of the AND gate.

2. The method of claim 1, wherein the fault-emulating subcircuit is to emulate one of:

a stuck-at-one fault;

a stuck-at-zero fault;

a wrong-component-type fault;

a connection-failure fault; and a bridging fault.

3. The method of claim 1, wherein the quantum gates comprise one or more of: a Pauli-X gate, a Hadamard gate, a Controlled NOT (CNOT) gate, and a Controlled Controlled NOT (CCNOT) gate.

4. A computer system, comprising:

a processor; and a storage device storing instructions that when executed by the processor cause the computer to perform a method for diagnosing a classical digital circuit, the method comprising:

obtaining a design of the classical digital circuit;

generating a design of a diagnostic circuit by augmenting the design of the digital circuit based on a number of fault-emulating subcircuits, wherein the diagnostic circuit comprises a set of primary inputs, a set of fault inputs corresponding to potential fault locations in the classical digital circuit, a plurality of classical logic gates, and a set of primary outputs, and wherein augmenting the design of the digital circuit comprises coupling a fault-emulating subcircuit to an output of each logic gate in the digital circuit;

converting the design of the diagnostic circuit to a design of a quantum oracle circuit, comprising:

replacing each classical logic gate in the diagnostic circuit with an equivalent quantum subcircuit and representing the primary and fault inputs using qubits; and creating one or more ancillary qubits corresponding to outputs of logic gates in the diagnostic circuit; and constructing a quantum diagnostic circuit based on the design of the quantum oracle circuit by applying a Hadamard gate to qubits representing fault inputs of the diagnostic circuit;

coupling multiple outputs of the diagnostic circuit to a single AND gate;

observing states of the quantum diagnostic circuit to determine probability distributions of one or more faults in the classical digital circuit, wherein observing the states of the quantum diagnostic circuit comprises observing states of qubits representing the fault inputs and observing states of a qubit representing an output of the AND gate; and collecting statistics of the observed states of the quantum diagnostic circuit based on the observed states of qubits representing the fault inputs and the observed states of the qubit representing the output of the AND gate.

5. The computer system of claim 4, wherein the fault-emulating subcircuit is to emulate one of:

a stuck-at-one fault;

a stuck-at-zero fault;

a wrong-component-type fault;

a connection-failure fault; and a bridging fault.

6. The computer system of claim 4, wherein the quantum gates comprise one or more of: a Pauli-X gate, a Hadamard gate, a Controlled NOT (CNOT) gate, and a Controlled Controlled NOT (CCNOT) gate.

7. A non-transitory computer-readable storage medium storing instructions which, when executed by a processor of a computing system cause the computing system to perform a method for diagnosing a classical digital circuit, the method comprising:

obtaining, by a computer, a design of the classical digital circuit;

generating a design of a diagnostic circuit by augmenting the design of the classical digital circuit based on a number of fault-emulating subcircuits, wherein the diagnostic circuit comprises a set of primary inputs, a set of fault inputs corresponding to potential fault locations in the classical digital circuit, a plurality of classical logic gates, and a set of primary outputs, and wherein augmenting the design of the digital circuit comprises coupling a fault-emulating subcircuit to an output of each logic gate in the digital circuit;

converting the design of the diagnostic circuit to a design of a quantum oracle circuit, comprising:

replacing each classical logic gate in the diagnostic circuit with an equivalent quantum subcircuit and representing the primary and fault inputs using qubits; and creating one or more ancillary qubits corresponding to outputs of logic gates in the diagnostic circuit; and constructing a quantum diagnostic circuit based on the design of the quantum oracle circuit by applying a Hadamard gate to qubits representing fault inputs of the diagnostic circuit;

coupling multiple outputs of the diagnostic circuit to a single AND gate;

observing states of the quantum diagnostic circuit to determine probability distributions of one or more faults in the classical digital circuit, wherein observing the states of the quantum diagnostic circuit comprises observing states of qubits representing the fault inputs and states a qubit representing an output of the AND gate; and collecting statistics of the observed states of the quantum diagnostic circuit based on the observed states of qubits representing the fault inputs and the observed states of the qubit representing the output of the AND gate.

8. The non-transitory computer-readable storage medium of claim 7, wherein the fault-emulating subcircuit is to emulate one of:

a stuck-at-one fault;

a stuck-at-zero fault;

a wrong-component-type fault;

a connection-failure fault; and a bridging fault.

9. The non-transitory computer-readable storage medium of claim 7, wherein the quantum gates comprise one or more of: a Pauli-X gate, a Hadamard gate, a Controlled NOT (CNOT) gate, and a Controlled Controlled NOT (CCNOT) gate.

* * * * *